Patented June 23, 1953

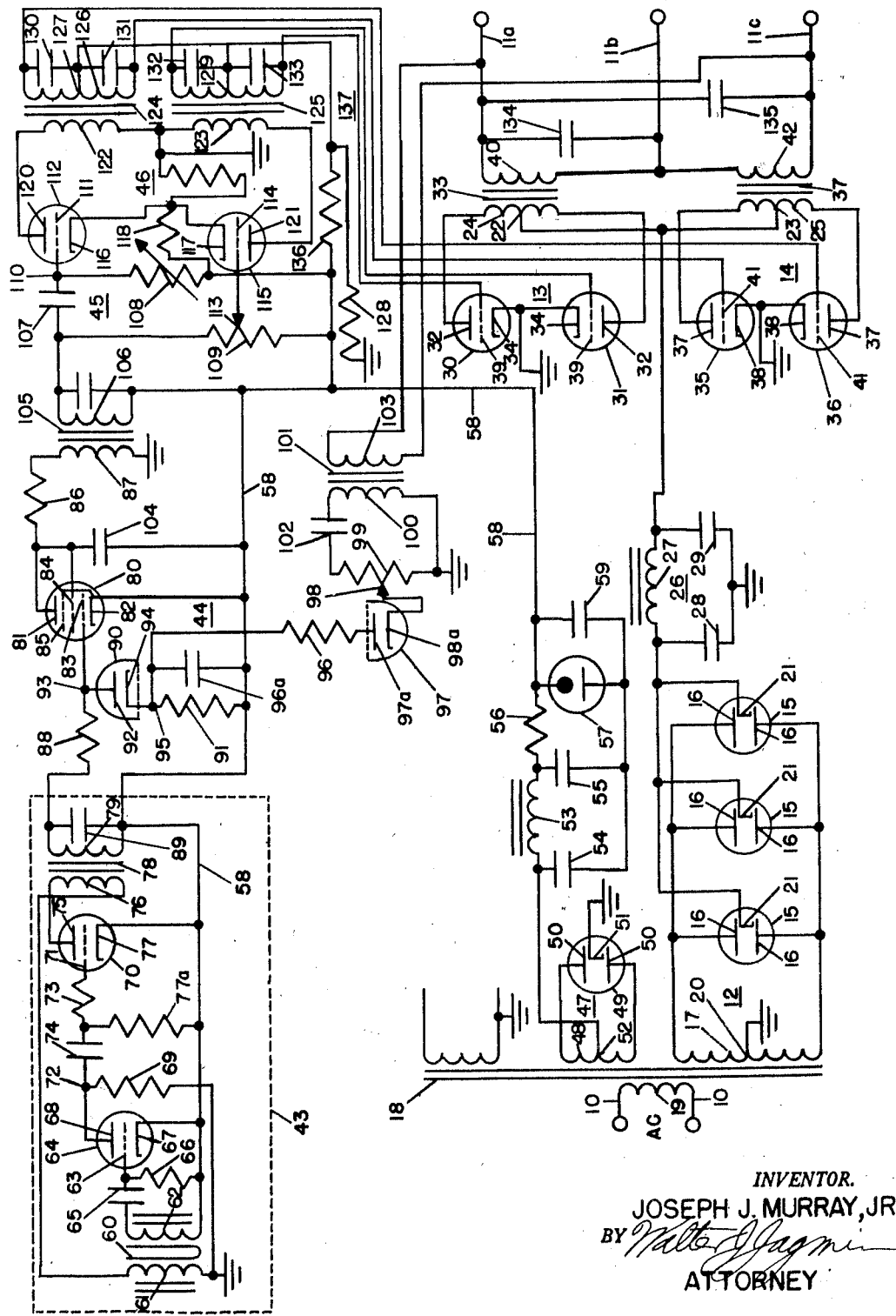

2,643,358

UNITED STATES PATENT OFFICE 2,643,358

ELECTRIC TRANSLATING APPARATUS

Joseph Jackson Murray, Jr., Garland, Tex.

Application August 23, 1951, Serial No. 243,310

15 Claims. (Cl. 321—5)

This invention relates to electric translating apparatuses and more particularly to an electric translating apparatus for energizing a polyphase alternating current load circuit.

In certain installations a translating apparatus must be provided for energizing a polyphase constant voltage alternating current load circuit with an alternating current of very constant frequency and of constant voltage from a single phase variable voltage alternating current supply circuit. The translating apparatus should preferably be simple in design employing a comparatively small number of elements, should be provided with controls for easily balancing the phase voltages, should be provided with a control which will vary all the phase voltages simultaneously to set the voltage of the polyphase circuit at a selected value and should be capable of maintaining the voltage of the polyphase circuit substantially constant regardless of variations in the voltage of the supply circuit and of variations in the load.

Accordingly, it is an object of this invention to provide a new and improved electric translating apparatus.

It is another object of this invention to provide a new and improved electric translating apparatus for transmitting energy from a single phase alternating current supply circuit to a three phase alternating current supply circuit.

It is still another object of the invention to provide a new and improved electric translating apparatus for transmitting energy from a single phase alternating current supply circuit to a three phase alternating current load circuit which is provided with a voltage control circuit for maintaining the voltage of the three phase circuit substantially constant.

It is a still further object of the invention to provide a new improved electric translating apparatus for the transmission of energy from a direct current supply circuit to a three phase alternating current load circuit.

It is a further object of this invention to provide a new and improved electric translating system for transmitting energy from a direct current supply circuit to a three phase alternating current load circuit.

It is a still further object of this invention to provide a new and improved electric translating system for transmitting energy from a direct current supply circuit to a polyphase alternating current load circuit.

It is another object of this invention to provide a new and improved electric translating system for transmitting energy from a direct current supply circuit to a two phase alternating current load circuit.

It is still another object of the invention to provide a new and improved electric translating apparatus for transmitting energy from a direct current supply circuit to a three phase alternating current load circuit which is provided with a voltage control circuit for maintaining the voltage of the three phase circuit substantially constant.

Briefly stated, the new and improved electric translating apparatus for transmitting energy from a single phase variable frequency alternating current supply circuit to a three phase constant frequency alternating current load circuit includes a pair of inverters, each having a pair of electric discharge means provided with control members, which are energized with direct current by a rectifier connected between the supply circuit and the inverters. Each of the inverters directly energizes one phase of the three phase load circuit. A source of single phase alternating current of the desired constant frequency is provided to energize a phase adapter which produces a pair of alternating potentials 60 electrical degrees apart in phase. These alternating potentials are impressed on the control members of the electric discharge means of the two inverters to maintain the voltages of the two phases of the three phase alternating current load circuit directly energized by the inverters 60 electrical degrees apart in phase. The third phase voltage appears across the two phases directly energized by the inverters. The alternating potentials impressed on the control members of the electrical discharge means of the inverters are varied in accordance with the voltage of the third phase by means of a control electric discharge means connected between the source of single phase alternating current and the phase adapter. A control circuit responsive to the voltage of the third phase is employed to vary the potential of the control member of the control electric discharge means in accordance with the voltage of the third phase to maintain substantially constant the voltage of the three phase alternating current load circuit.

For a better understanding of the invention, reference may be had to the following description taken in connection with the accompanying drawing and its scope will be pointed out in the appended claims. The single figure of the drawing diagrammatically illustrates a preferred embodiment of the invention.

Referring now to the drawing, the single figure of the drawing illustrates diagrammatically a preferred embodiment of the invention for transmitting energy from a single phase variable frequency alternating current supply circuit 10 to a three phase constant frequency output circuit 11a, 11b, and 11c, which comprises a rectifier 12 and a pair of inverters 13 and 14 connected between the supply and output circuits.

The rectifier 12 is of conventional design having a plurality of rectifying electric discharge means 15 each of which is provided with a pair of anodes 16 connected to opposite terminals of the secondary winding 17 of a transformer 18 whose primary winding 19 is connected across the supply circuit 10. The electrical midpoint 20 of the secondary winding is connected to ground. The cathodes 21 of the electric discharge means 15 are connected to the electrical midpoints 22 and 23 of the primary windings 24 and 25, respectively, through a filter 26. The filter may be of conventional design having a reactor 27 and a pair of capacitors 28 and 29.

The inverter 13 comprises a pair of electric discharge means 30 and 31 having anodes 32 connected to opposite sides of the primary winding 24 of the transformer 33 and cathodes 34 connected to the electrical midpoint 20 of the secondary winding 17 through ground. The inverter 14 similarly comprises a pair of electric discharge means 35 and 36 having anodes 37 connected to opposite sides of the primary winding 25 of the transformer 37 and cathodes 38 connected to the electric midpoint 20 of the secondary winding 17 through ground. Alternating potentials are impressed on the control grids 39 of the electric discharge means 30 and 31 of the inverter 13 to render the electric discharge means 30 and 31 alternately conductive thus inducing an alternating current in the secondary winding 40 of the transformer 33. Similarly, alternating potentials are impressed on the control grids 41 of the electric discharge means 35 and 36 of inverter 14 to render the electric discharge means 35 and 36 alternately conductive thus inducing an alternating current in the secondary winding 42 of the transformer 37. If the alternating currents induced in the secondary windings 40 and 42 are properly displaced in phase, the output circuit 11a, 11b, and 11c will be energized by a three phase alternating current. The phases across terminals 11a and 11b and across terminals 11b and 11c are directly energized by the inverters 13 and 14, respectively, while the "phantom" phase across the terminals 11a and 11c is indirectly energized by both inverters.

The circuit for impressing the alternating potentials on the control grids of the electric discharge means of the inverters 13 and 14 includes a tuning fork controlled frequency generator 43 for supplying an alternating current of very constant frequency, a voltage control circuit 44 responsive to the variations in the voltage across the terminals 11a and 11c for controlling the amplitude of the alternating potentials impressed on the control grids of the electric discharge means of the inverters 13 and 14, a phase shifting circuit 45 for producing two alternating potentials differing in phase by 60 electrical degrees, and an amplifying circuit 46 for amplifying the two differing in phase alternating potentials and impressing them on the control grids. An auxiliary rectifier circuit 47 is provided to supply direct current to the frequency generator 43, the voltage control circuit 44, and the amplifying circuit 46.

The rectifying circuit 47 includes a secondary winding 48 on the transformer 18 and an electric discharge means 49 having a pair of anodes 50 connected to opposite sides of the secondary winding 48 and a cathode 51 connected to ground. The electrical midpoint 52 of the secondary winding 48 is connected to the various circuits energized with direct current from the rectifying circuit through a filter comprising a reactor 53 and a pair of capacitors 54 and 55 and through a resistance 56. A glow discharge means 57 is connected between resistance 56 and the ground. Glow discharge means 57 acts as a voltage regulator to maintain substantially constant the voltage across conductor 58 to ground. A capacitor 59 may be connected across the glow discharge means 57.

The frequency generator 43 is of conventional type in which a tuning fork 60 is employed as a frequency standard. The tuning fork 60 is positioned between a driving coil 61 which maintains the tuning forks in vibration and a pick-up coil 62 in which the vibration of the tuning fork induces a potential. This potential is impressed on the control grid 63 of an electric discharge means 64 through a blocking capacitor 65. A biasing resistance 66 is connected between the control grid 63 and the cathode 67 of the electric discharge means 64. The electric discharge means 64 is also provided with an anode 68 which is connected to the cathode 51 of the rectifier electric discharge means 49 through a resistance 69 and ground. The cathode 67 is connected to the conductor 58 so that the electric discharge means 64 is energized with direct current from the rectifier 47.

An electric discharge means 70, employed as an amplifier, is provided with a control grid 71 which is connected to the common connection 72 of the resistance 69 and the anode 68 through a current limiting resistance 73 and a blocking capacitor 74. The anode 75 of the electric discharge means is connected to the cathode 51 of the rectifier 49 through the primary winding 76 of an output transformer 78, the driving coil 61 which is connected in series with the primary winding 76, and ground while the cathode 77 is connected to conductor 58. A biasing resistance 77a connects the cathode 77 to the control grid 71 through the resistance 73. As will be apparent to those skilled in the art, the tuning fork 60 is maintained in vibration by the pulsating current in driving coil 61. The pulsation of this current is governed by the potential induced in pick-up coil 62 by the vibration of the tuning fork so that the tuning fork acts as a frequency standard. The pulsating current in the primary winding of the transformer 78 induces an alternating current in the secondary winding 79 which is employed to control the frequency of the alternating current in the three phase output circuit 11a, 11b, and 11c.

In order to maintain constant the voltage of the three phase output circuit, the alternating potentials impressed on the control grids 39 and 41 of the electric discharge means of the two inverters are varied in accordance with the phase voltage appearing across the terminals 11a and 11c by the voltage control circuit 44. Voltage control circuit 44 comprises a control electric discharge means 80 provided with an anode 81, a cathode 82, a control grid 83, a screen grid 84 and a shield grid 85. The anode 81 is connected to the cathode 51 of the rectifier electric discharge means 49 through a resistance 86 and the primary winding 87 of a transformer 105. The cathode 82 is connected to the conductor 58 so that the anode-cathode circuit of the control electric discharge means 80 is energized by direct current from rectifier 47.

The constant frequency alternating potential induced in the secondary winding 79 of the transformer is impressed on the control grid 83 of the control electric discharge means 80, one side of the secondary winding 79 being connected to the control grid 83 through a clipper resistance 88 and the other side being connected to the cathode 82. The capacitance 89 is connected across the secondary winding 79 to improve the wave form of the alternating potential of the secondary winding. In order to vary the conductivity of the control electric discharge device in accordance with the voltage of the phase 11a and 11c of the output circuit, an electric discharge means 90 is connected in series with a resistance 91. The anode 92 of the electric discharge means 90 is connected to the common connection 93 of the clipper resistance 88 and the control grid 83 while its cathode 94 is connected to one side of the resistance 91. The other side of the resistance is connected to the secondary winding 79 through the resistance 91. The common connection 95 of the cathode 94 and the resistance 91 is connected to ground through a resistance 96, and an electric discharge means 97 having an anode 97a connected to the resistance 96 and a cathode 98a connected through a contact 98 to a resistance 99. The resistance 96 and the capacitor 96a connected across the resistance 91 are employed to prevent control oscillation.

The secondary winding 100 of a transformer 101 and a blocking capacitor 102 are connected in series across the resistance 99. The primary winding 103 of the transformer is connected across conductors 11a and 11c of the output circuit.

The voltage control circuit 44 just described varies the conductivity of the electric discharge means 83 in accordance with the voltage across the conductors 11a and 11c once this voltage rises above a predetermined value, thus acting as a delayed control. Assuming now that the voltage across the conductor 11a and 11c is below the predetermined value, the electric discharge means 97 is nonconductive since the voltage of the rectifier 47 maintains the cathode 98a positive, the electric discharge means 90 is also nonconductive or only slightly conductive and a positive potential is impressed on the control grid 83 during positive half cycles of the current induced in the secondary winding 79. The potential impressed on the control grid 83 will be of substantially square wave form due to the action of the clipper resistance 88 and the conduction of current between the control grid 83 and the cathode 82 once current flow is established between the anode 81 and cathode 82.

If the voltage across conductors 11a and 11c rises above the predetermined value, the voltage induced in the secondary winding 100 of the transformer 101 by the current in the primary winding 103 will be sufficient to overbalance the positive voltage applied to the cathode 98a from cathode 51 through ground, the lower portion of resistance 99 and contact 100. As a result, the cathode 98a will be negative during the half-cycles a positive potential is applied to the anodes 92 and 97a. The electric discharge means 97 will be rendered conductive and the electric discharge means 90 will be rendered conductive or more conductive to lower the potential impressed on the control grid 83 and thus render the electric discharge means 80 less conductive. Once the electric discharge means 97 is rendered conductive, its conductivity will vary directly as the value by which the voltage across the conductors 11a and 11c exceeds the predetermined value. It will be apparent, therefore, that the pulsating current flowing in the winding 87 will be permitted to increase until the voltage across the conductors 11a and 11c exceeds the predetermined value and is thereafter maintained substantially constant as long as the voltage across the conductors 11a and 11c exceeds the predetermined value. The electric discharge means 90 and 97 may also be regarded as biasing control means which vary the biasing potential applied to the control grid 83 of the electric discharge means 80 in accordance with the voltage across the conductors 11a and 11c as long as the voltage exceeds the predetermined value. The resistance 86 and the capacitor 104, which has one side connected to cathode 82, form a wave shaping circuit employed to improve the wave form of the current flowing in the winding 87.

The pulsating current in the primary winding 87 of the transformer 105 induces an alternating current in its secondary winding 106. The conventional phase shifting circuit 45 energized from the secondary winding 106 includes a capacitor 107 and a variable resistance 108 connected in series across the secondary winding 106. A resistance 109 is also connected across the secondary winding. The common connection 110 of the capacitor 107 and the resistance 108 is connected to the control grid 111 of the electric discharge means 112 of the amplifier circuit 46 while the adjustable contact 113 on the resistance 109 is connected to the control grid 114 of the electric discharge means 115 of the amplifier circuit. The cathodes 116 and 117 of the electric discharge means 112 and 115, respectively, are connected through the resistance 118 to one side of the secondary winding 106. The phase shifting circuit 45, in a manner well known to those skilled in this art, shifts the phase of the alternating potential impressed on the control grid 111 60 electrical degrees from the phase of the alternating potential impressed on the control grid 114. By varying the position of the adjustable contact 113 on the resistance 109 and varying the value of the variable resistance 108, the phase difference of the two potentials impressed on the control grids 111 and 114 may be adjusted to exactly 60 electrical degrees and their values adjusted so that the potentials induced in the secondary windings 40 and 42 may be made exactly equal.

The anodes 120 and 121 of the electric discharge means 112 and 115 are connected to the cathode 51 of the rectifier 49 through the primary windings 122 and 123 of the transformers 124 and 125 and cathodes 116 and 117 are connected to the conductor 58 so that the anode-cathode circuits of the electric discharge means 112 and 115 of the amplifier circuit are energized with direct current from the rectifier circuit 47. The opposite sides of the secondary winding 126 of the transformer 124 are connected to the control grids 41 of the electric discharge means 35 and 36, respectively, of the inverter 14 while its electrical midpoint 127 is connected to the cathodes 28 through a resistance 126 and ground to impress alternating potentials on the control grids 41 which render the electric discharge means 35 and 36 alternately conductive. The opposite sides of the secondary winding 129 of the transformer 125 are connected to the control grids 39 of the electric discharge means 30 and 31, respectively, of the inverter 13 while its electrical midpoint is connected to the cathodes 34 through the resistance 128 and ground to impress on the control grids 39 alternating potentials which render the electric discharge means 30 and 31 alternately conductive. Due to the action of the phase shifting circuit 45, the alternating currents induced in the secondary windings 40 and 42 of the transformers 33 and 37 of the inverters 13 and 14 are 60 electrical degrees apart so that the conductors 11a, 11b, and 11c constitute a three phase alternating current circuit. The capacitors 130, 131, 132 and 133 connected across the upper and lower portions of the secondary windings 126 and 129, respectively, are provided to improve the wave shape of the potentials applied to the control grids 39 and 41. Capacitors 134 and 135 are connected across the conductors 11a and 11b, and 11b and 11c, respectively, to aid load balance and improve the power factor.

The resistances 136 and 128 constitute a voltage divider 137 to impress a suitable negative biasing potential on the control grids 39 and 41 of the inverters 13 and 14.

In use, when an alternating current of variable frequency is applied to the primary winding 19 of the transformer 18, the rectifier circuit 47 supplies direct current of substantially constant voltage to the frequency generator 43 and the voltage divider 137. An alternating potential of very constant frequency is applied by the frequency generator to the control grid 83 of the control electric discharge device 80. The voltage sensing and control circuit which comprises the electric discharge devices 96 and 97, which may be contained in a single envelope, then operates to vary the potential impressed on the control grid 83 in accordance with the variation of the voltage across the conductors 11a and 11c once the voltage across the conductors exceeds a predetermined value. The variations in the conductivity of the control electric discharge means 80, which decreases as the voltage across 11b and 11c increases, result in corresponding variations in the voltage induced in the secondary winding 106 of the transformer 105. The variation in this voltage will result in corresponding variations in the potentials impressed on the control grids 39 and 41 of the electric discharge means of the inverters 13 and 14, respectively. The resulting variations in conductivity of these electric discharge means of the inverters will vary the amount of current flowing in the primary windings 24 and 25 of the transformers 33 and 37 in such fashion that the current in the primary windings 24 and 25 will tend to decrease when the voltage across the conductors 11a and 11c tends to increase above the predetermined value. In this manner the voltage across conductors 11a and 11c is maintained constant. Since this voltage will remain constant only as long as the voltages across the conductors 11a and 11b, and 11b and 11c remain constant, the latter phase voltages will necessarily also be maintained constant.

The relative phase positions of the phase voltages across the conductors 11a and 11b and the conductors 11b and 11c can be set by varying the resistance 108 and adjusting the position of contact 113 on the resistance 109. These variable elements also control the values of the voltages across the conductors 11a and 11b and the conductors 11b and 11c so that several adjustments of the variable resistance 108 and the contact 113 may have to be made before these voltages not only differ in phase by 60 electrical degrees but are also equal.

The phase voltages, across the conductors 11a and 11b, the conductors 11b and 11c, and the conductors 11a and 11c can be varied equally and simultaneously by adjustment of the contact 99 on the resistance 98 after the phase relations and phase voltage magnitudes have been adjusted by means of the variable resistances 108 and 113.

The primary winding 103 of the voltage sensing transformer 101 may be connected across either the conductors 11a and 11b or the conductors 11b and 11c instead of as shown if desired. The illustrated arrangement is preferred, however, since a more accurate voltage control of all phases is obtained if the primary winding 103 is connected across the phantom phase.

Moreover, the phase difference of the outputs of the two inverters may be adjusted so that the conductors 11a, 11b, and 11c constitute a two phase circuit instead of the three phase system described. It will also be apparent that other voltage control circuits may be employed in place of the circuit illustrated.

It will be apparent to those skilled in the art that various changes and modifications may be made in the illustrated embodiment of the invention without departing from the invention and it is intended, therefore, in the appended claims to cover all such changes and modifications as fall within the true spirit and scope of the invention.

What I claim as new and desire to secure by Letters Patent of the United States is:

1. An apparatus for transmitting energy from a direct current system to a polyphase alternating current system comprising: a pair of single phase inverters connected in parallel between said systems; each of said inverters comprising a pair of electric discharge means provided with control grids and cathodes, and a grid transformer provided with a secondary winding having outer terminals connected to the control grids of the pair of electric discharge means and having its electrical midpoint connected to the cathodes of the pair of electric discharge means, said grid transformer having a primary winding connected across a source of alternating current of a predetermined frequency; phase shifting means connected between said source of alternating current and said primary windings of said grid transformers for maintaining the alternating current in the primary windings differing in phase a predetermined degree and means connected between said source and said phase shifting means operatively associated with said polyphase alternating current system for varying the current in said primary windings in accordance with the voltage of said polyphase system is maintained substantially constant.

2. An apparatus for transmitting energy from a direct current system to a polyphase alternating current system comprising: a pair of single phase inverters connected in parallel between said systems, each of said inverters directly energizing one phase of said polyphase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means connected between said source and said phase shifting means and responsive to the voltage of one phase of said polyphase system for varying the voltage of the alternating current energizing said phase shifting means in accordance with the voltage of said one phase to maintain the phase voltages of said polyphase system substantially constant.

3. An apparatus for transmitting energy from a direct current system to a polyphase alternating current system comprising: a pair of single phase inverters connected in parallel between said systems, each of said inverters directly energizing one phase of said polyphase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means connected between said source and said phase shifting means and responsive to the voltage of one phase of said polyphase system for varying the voltage of the alternating current energizing said phase shifting means in accordance with the voltage of said one phase to maintain the phase voltages of said polyphase system substantially constant, said last mentioned means becoming operative after the voltage of said one phase of said polyphase system rises above a predetermined value.

4. An apparatus for transmitting energy from a direct current system to a three phase system comprising: a pair of single phase inverters connected in parallel between said systems; each of said inverters comprising a pair of electric discharge means provided with control grids and cathodes, and a grid transformer provided with a secondary winding having outer terminals connected to the control grids of the pair of electric discharge means and having its electrical midpoint connected to the cathodes of the pair of electric discharge means, said grid transformer having a primary winding connected across a source of alternating current of a predetermined frequency; phase shifting means connected between said source of alternating current and said primary windings of said grid transformers for maintaining the alternating currents in the primary windings differing in phase a predetermined degree; and means connected between said source and said phase shifting means operatively associated with said three phase system for varying the current in said primary windings in accordance with the voltage of said three phase system whereby the voltage of said polyphase system is maintained substantially constant.

5. An apparatus for transmitting energy from a direct current system to a three phase alternating current system comprising: a pair of single phase inverters connected in parallel between said systems, each of said inverters directly energizing one phase of said three phase alternating current system; means adapted to be energized from a source of alternating current of a predetermined frequency for controlling the frequency of the alternating current output of said inverters; phase shifting means connected between said source and said last mentioned means for maintaining the alternating current outputs of said inverters differing in phase a predetermined degree; and means connected between said source and said phase shifting means responsive to the voltage of one phase of said three phase system for varying the voltage of the alternating current energizing said phase shifting means in accordance with the voltage of said one phase to maintain the phase voltages of said three phase system substantially constant.

6. An apparatus for transmitting energy from a direct current system to a three phase alternating current system comprising: a pair of single phase inverters connected in parallel between said systems, each of said inverters directly energizing one phase of said three phase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means connected between said source and said phase shifting responsive to the voltage of one phase of said three phase system for varying the voltage of the alternating current energizing said phase shifting means in accordance with the voltage of said one phase to maintain the phase voltages of said three phase system substantially constant, said last mentioned means becoming operative after the voltage of said one phase of said three phase system rises above a predetermined value.

7. An apparatus for transmitting energy from a direct current system to a polyphase alternating current system comprising: a pair of single phase inverters connected in parallel between said systems; each of said inverters comprising a pair of electric discharge means provided with control grids and cathodes, and a grid transformer provided with a secondary winding having outer terminals connected to the control grids of the pair of electric discharge means and having its electrical midpoint connected to the cathodes of the pair of electric discharge means, said grid transformer having a primary winding; phase shifting means connected across a source of alternating current of a predetermined frequency for supplying alternating currents varying in phase a predetermined degree; means for amplifying said alternating currents and energizing said primary windings of the grid transformers; and means connected between said source and said phase shifting means operatively associated with said polyphase alternating current system for varying the currents in said primary windings in accordance with the voltage of said polyphase system whereby the voltage of said polyphase system is maintained substantially constant.

8. An apparatus for transmitting energy from a direct current system to a two phase alternating current system comprising a pair of single phase inverters connected in parallel between said systems; each of said inverters comprising a pair of electric discharge means provided with control grids and cathodes, and a grid transformer provided with a secondary winding having outer terminals connected to the control grids of the pair of electric discharge means and having its midpoint connected to the cathodes of the pair of electric discharge means, said grid transformer heaving a primary winding connected across a source of alternating current of a predetermined frequency; phase shifting means connected between said source of alternating current and said primary windings of said grid transformers for maintaining the alternating currents in the primary windings differing in phase a predetermined degree; and means connected between said source and said phase shifting means operatively associated with said two phase alternating current system for varying the current in said primary windings in accordance with the voltage of said two phase system whereby the voltage of said polyphase system is maintained substantially constant.

9. An apparatus for transmitting energy from a direct current system to a two phase alternating current system comprising: a pair of single phase inverters connected in parallel between said systems, each of said inverters directly energizing one phase of said two phase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means connected between said source and said phase shifting means and responsive to the voltage of said two phase system for varying the voltage energizing said phase shifting means in accordance with the voltage of the two phase system to maintain the phase voltages of said two phase system substantially constant.

10. An apparatus for transmitting energy from a direct current system to a two phase alternating current system comprising: a pair of single phase inverters connected in parallel between said systems each of said inverters directly energizing one phase of said two phase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means connected between said source and said phase shifting means and responsive to the voltage of said two phase system for varying the voltage energizing phase shifting means in accordance with the voltage of the two-phase system to maintain the phase voltages of said two phase system substantially constant, said last mentioned means becoming operative after the voltage of said one phase of said two phase system rises above a predetermined value.

11. An apparatus for transmitting energy from a direct current system to a polyphase alternating current system comprising: a pair of single phase inverters connected in parallel between said systems, each of said inverters directly energizing one phase of said polyphase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means connected between said source and said phase shifting means and responsive to the voltage of one phase of said polyphase system for varying the voltage of the alternating current energizing said phase shifting means in accordance with the voltage of said one phase to maintain the phase voltages of said polyphase system substantially constant, said last mentioned means becoming operative after the voltage of said one phase of said polyphase systems rises above a predetermined value; and means operatively associated with said voltage responsive means for selectively adjusting said predetermined value.

12. An apparatus for transmitting energy from a direct current system to a three phase alternating current system comprising: a pair of single phase inverters connected in parallel between said systems, each of said inverters directly energizing one phase of said three phase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means connected between said source and said phase shifting responsive to the voltage of one phase of said three phase system for varying the voltage of the alternating current energizing said phase shifting means in accordance with the voltage of said one phase to maintain the phase voltages of said three phase system substantially constant, said last mentioned means becoming operative after the voltage of said one phase of said three phase system rises above a predetermined value; and means operatively associated with said voltage responsive means for selectively adjusting said predetermined value.

13. An apparatus for transmitting energy from a direct current system to a two phase alternating current system comprising: a pair of single phase inverters connected in parallel between said systems, each of said inverters directly energizing one phase of said two phase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means connected between said source and said phase shifting means and responsive to the voltage of said two phase system for varying the voltage energizing said phase shifting means in accordance with the voltage of the two-phase system to maintain the phase voltages of said two phase system substantially constant, said last mentioned means becoming operative after the voltage of said one phase of said two phase system rises above a predetermined value; and means operatively associated with said voltage responsive means for selectively adjusting said predetermined value.

14. An apparatus for transmitting energy from a direct current system to a polyphase alternating current system comprising: a pair of single phase inverters connected in parallel between said systems; each of said inverters comprising a pair of electric discharge means provided with control grids and cathodes, and a grid transformer provided with a secondary winding having outer terminals connected to the control grids of the pair of electric discharge means and having its electrical midpoint connected to the cathodes of the pair of electric discharge means, said grid transformer having a primary winding connected across a source of alternating current of a predetermined frequency; phase shifting means connected between said source of alternating current and said primary windings of said grid transformers for maintaining the alternating currents in the primary windings differing in phase a predetermined degree; and means responsive to the voltage across one phase of said polyphase system for varying the alternating potential across said phase shifting means in accordance with the voltage across said one phase to maintain the voltage of said polyphase system substantially constant.

15. An apparatus for transmitting energy from a direct current system to a polyphase alternating current system comprising: a pair of single phase inverters connected in parallel between said systems, each of said inverters directly energizing one phase of said polyphase alternating current system; means adapted to be energized from a source of alternating current of a predetermined frequency for controlling the frequency of the alternating current outputs of said inverters; phase shifting means connected between said source and said last mentioned means for maintaining the alternating current outputs of said inverters differing in phase a predetermined degree; and means responsive to the voltage across one phase of said polyphase system for varying the alternating potential across said phase shifting means in accordance with the voltage across said one phase to maintain the voltage of said polyphase system substantially constant.

JOSEPH JACKSON MURRAY, Jr.

References Cited in the file of this patent

UNITED STATES PATENTS

| Number | Name | Date |
|---|---|---|
| 1,867,503 | Fitz et al. | July 12, 1932 |

FOREIGN PATENTS

| Number | Country | Date |
|---|---|---|
| 443,189 | Great Britain | Feb. 24, 1936 |